United States Patent
Hunter

(10) Patent No.: US 11,958,682 B2
(45) Date of Patent: Apr. 16, 2024

(54) AUTOMATIC CONTAINER INTERLOCK APPARATUS AND METHODS OF USE

(71) Applicant: Steven B. Hunter, Austell, GA (US)

(72) Inventor: Steven B. Hunter, Austell, GA (US)

(*) Notice: Subject to any disclaimer, the term of this patent is extended or adjusted under 35 U.S.C. 154(b) by 83 days.

(21) Appl. No.: 17/869,916

(22) Filed: Jul. 21, 2022

(65) Prior Publication Data

US 2024/0025634 A1  Jan. 25, 2024

(51) Int. Cl.
*B65D 90/00* (2006.01)

(52) U.S. Cl.
CPC .. *B65D 90/0013* (2013.01); *B65D 2590/0033* (2013.01)

(58) Field of Classification Search
CPC ............... B65D 90/0013; B65D 2590/0033
See application file for complete search history.

(56) References Cited

U.S. PATENT DOCUMENTS

| | | | |
|---|---|---|---|
| 3,691,595 A | 9/1972 | Backteman et al. | |
| 3,753,272 A | 8/1973 | Laidley | |
| 4,196,673 A | 4/1980 | Looks | |
| 4,522,780 A * | 6/1985 | Shallenberger | G21C 19/02 976/DIG. 247 |
| 5,062,752 A | 11/1991 | Takaguchi | |
| 5,791,808 A | 8/1998 | Nyholm | |
| 10,947,036 B2 * | 3/2021 | Helou, Jr. | B64D 9/003 |
| 2003/0214143 A1 * | 11/2003 | Walker | B65D 90/0026 294/81.53 |
| 2009/0252569 A1 * | 10/2009 | Walker | B65D 90/0006 410/78 |
| 2015/0344223 A1 * | 12/2015 | Hwang | B65D 90/0013 220/1.5 |
| 2020/0354198 A1 * | 11/2020 | Clive-Smith | B66C 1/663 |
| 2021/0394666 A1 * | 12/2021 | Newstead | B65D 90/0013 |

FOREIGN PATENT DOCUMENTS

DE  102004016278  10/2005

* cited by examiner

*Primary Examiner* — David M Upchurch
(74) *Attorney, Agent, or Firm* — Mathew L. Grell, Esq.; Grell & Watson Patent Attorneys LLC

(57) ABSTRACT

An automatic container interlock apparatus having a central shaft, a drive wheel positioned on the drive wheel, a locking lever positioned upper end of central shaft configured to rotate between a locked and an unlocked position, a first vertical slide extension and second vertical slide extension, said first vertical slide extension configured to vertically extend and collapse, the first vertical slide extension and the second vertical slide extension having a second collar slider, a shaft pin, a pair of flex arms having a first flex arm assembly and a second flex arm assembly, the first flex arm assembly pivotably connected to the shaft pin and a first collar slider, the second flex arm assembly having pivotably connected to said shaft pin and the second collar slider, an expansion device between first flex arm assembly and second flex arm assembly, a first rotational drive arm and a second rotational drive arm.

12 Claims, 6 Drawing Sheets

AUTOMATIC CONTAINER INTERLOCK APPARATUS AND METHODS OF USE

FIELD OF THE DISCLOSURE

The present disclosure is directed to container coupler. More specifically, the present disclosure is directed to automatic interlock apparatus for releasably locking vertically stacked cargo containers to each other.

BACKGROUND

Container shipping has become the standby to ship goods whether on land or sea. The containers, ranging in size from to 40, 50, 60 feet in length, 8 feet in both width and height are stacked one on top of the other. Container alignment and positioning cones are inserted in container corner fittings and precisely align each container with the one below it as the stacks are built to their full height. During shipment, the containers are subject to vibration, swaying, rolling and pitching motions and the containers in the stacks must therefore be interlocked.

One prior approach of a coupler having a manual locking mechanism disposed between the containers, fitted with an upper cone to engage the upper container and a lower rotating rectangle to engage the lower container that can be rotated from an open position into a locked position in which the cone engages an undercut in corner fittings of the container by actuating a handle that protrudes horizontally through a slot-like opening in a side of the body.

At least one disadvantage or drawback to this approach is that it requires tedious hand work, often at hazardous heights, is time-consuming and costly. To further economize containerized shipping adjacent container stacks have been moved closer together until by now the stacks are often separated by less than an inch. This provides insufficient clearance to pin the containers in accordance with the prior art.

Therefore, it is readily apparent that there is a recognizable unmet need for an automatic container interlock apparatus and methods of use that may be configured to address at least some aspects of the problems discussed above common to locking vertically stacked cargo containers to each other.

SUMMARY

Briefly described, in an example embodiment, the present disclosure may overcome the above-mentioned disadvantages and may meet the recognized need for an automatic container interlock apparatus and methods of use for locking an upper container to a lower container where lower corner opening in upper container is aligned with upper corner opening in lower container having automatic container interlock apparatus having a lower unit configured to releasably affix therein the lower corner slot of the upper container, a central shaft, a drive wheel positioned on the drive wheel, a locking lever positioned upper end of central shaft configured to rotate between a locked and an unlocked position, a first vertical slide extension and second vertical slide extension, said first vertical slide extension configured to vertically extend and collapse, the first vertical slide extension and the second vertical slide extension having a second collar slider, a shaft pin, a pair of flex arms having a first flex arm assembly and a second flex arm assembly, the first flex arm assembly pivotably connected to the shaft pin and a first collar slider, the second flex arm assembly having pivotably connected to said shaft pin and the second collar slider, an expansion device between first flex arm assembly and second flex arm assembly, a first rotational drive arm and a second rotational drive arm and, thus, functions to provide an automatic locking interlock or coupler to lock vertically stacked cargo containers to each other.

Accordingly, in another aspect, the present disclosure of automatic container interlock apparatus may be configured to latch and unlatch when automatic container interlock apparatus contacts a rim of a corner opening of an opposing container and changes state from an unlocked/unlatched device to a locked/latched device.

Accordingly, in another aspect, the present disclosure of automatic container interlock apparatus may be configured to latch and unlatch when automatic container interlock apparatus is removed from contact with a rim of a corner opening of an opposing container and changes state from a locked/latched to an unlocked/unlatched device.

Accordingly, in another aspect, the present disclosure of automatic container interlock apparatus may be configured to collapse or recess therein corner opening of its container when in contact with surface, such as flat bet, ground, rail car or the like.

In an exemplary embodiment of the automatic container interlock apparatus to releasably affix a lower corner slot of an upper container to an upper corner slot of a lower container, having a lower unit configured to releasably affix therein the lower corner slot of the upper container, said lower unit having a center passageway, a left passageway, and a right passageway, a central shaft having a first shaft end and a second shaft end, said central shaft having a drive wheel positioned approximately midway between said first shaft end and second shaft end, said central shaft having a locking lever positioned proximate said first shaft end and configured to rotate between a locked and an unlocked position, said second shaft end configured to slide therein said center passageway, said central shaft having a drive wheel affixed to said central shaft a midpoint between said first shaft end and said second shaft end, a first vertical slide extension and second vertical slide extension, said first vertical slide extension configured to vertically extend and collapse in said left passageway and said second vertical slide extension configured to vertically extend and collapse right passageway, said first vertical slide extension having a first extension support spring positioned proximate a lower end of said first vertical slide extension and configured to extend said first vertical slide extension, said second vertical slide extension having a second extension support spring positioned proximate a lower end of said second vertical slide extension and configured to extend said second vertical slide extension, said first vertical slide extension having a first collar slider positioned around a lower end of said first vertical slide extension, said second vertical slide extension having a second collar slider positioned around a lower end of said second vertical slide extension, a shaft pin, said shaft pin slidably connected to said central shaft proximate said first shaft end, a pair of flex arms having a first flex arm assembly and a second flex arm assembly, said first flex arm assembly having first upper flex arm having a first end and a second end, said first end of said first upper flex arm pivotably connected to said shaft pin and a second end of said first upper flex arm pivotably connected to a first end of a first lower flex arm via a first pivot pin, a second end of said first lower flex arm pivotably connected to said first collar slider, said second flex arm assembly having second upper flex arm having a first end and a second end, said first end of said second upper flex arm pivotably connected to said shaft pin and a second end of said second upper flex arm pivotably connected to a first end of a second lower flex arm via a second pivot pin, a second end of said second lower flex arm pivotably connected to said second collar slider, an expansion device having first curved extension arm, a second curved extension arm, and an extension spring wrap therearound said first curved extension arm and said second curved extension arm, a first end of said first curved extension arm pivotably connected to said first upper flex arm and a first end of said second curved extension arm pivotably connected to said second upper flex arm, said expansion device configured to separate said first upper flex arm and said second upper flex arm, and a first rotational drive arm and a second rotational drive arm, a first end of said first rotational drive arm pivotably connected to said first pivot pin and a second end of said first rotational drive arm pivotably connected to a first side of said drive wheel, a first end of said second rotational drive arm pivotably connected to said second pivot pin and a second end of said second rotational drive arm pivotably connected to a second side of said drive wheel.

A feature of the present disclosure may include automatically locking and unlocking together an upper container and a lower container together without having a work person having to traverse the container while being moved or positioned one on top of the other.

A feature of the present disclosure may include automatic container interlock apparatus that changes state from an unlocked/unlatched device to a locked/latched device when the apparatus contacts a rim of a corner opening of an opposing container.

A feature of the present disclosure may include automatic container interlock apparatus that changes state from locked/latched to an unlocked/unlatched device when removed from contact with a rim of a corner opening of an opposing container.

A feature of the present disclosure may include automatic container interlock apparatus that changes state to a collapse or recess apparatus when in contact with surface, such as flat bet, ground, rail car or the like.

A feature of the present disclosure may include a self-contained locked/latched and unlocked/unlatched device.

A feature of the present disclosure may include enabling remote insertion of one end of automatic container interlock apparatus therein a corner opening of a container.

These and other features of the automatic container interlock apparatus and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1:
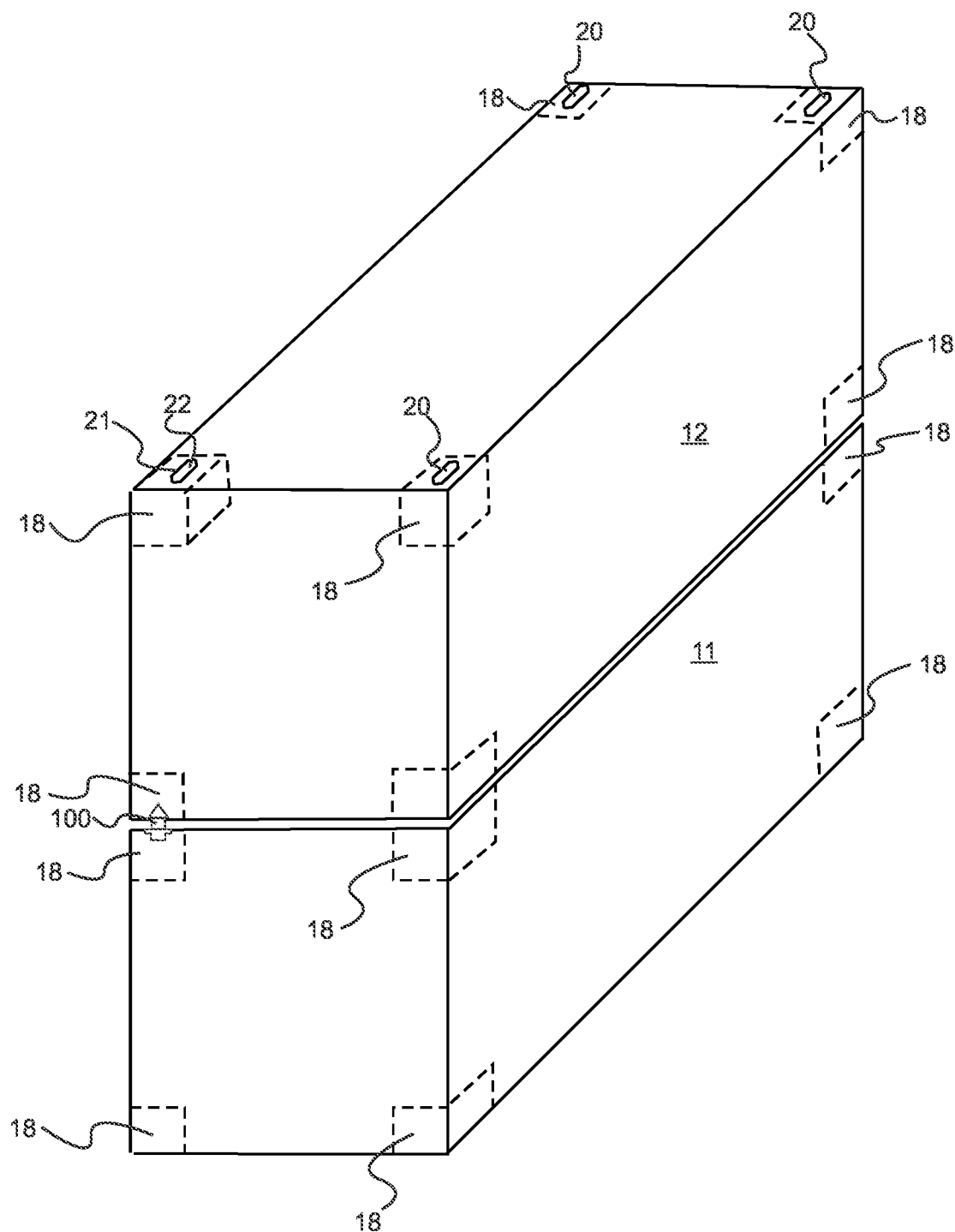
FIG. 1 is a perspective view of two vertically stacked containers each having upper and lower corner slots being interconnected with automatic locking container interlock apparatus according to select embodiments of the instant disclosure.

Referring now to FIGS. 1, by way of example, and not limitation, there is illustrated a plurality of cargo shipping and storage containers 10, lower container 11 with upper container 12 stacked vertically or placed on top of lower container 11. The containers have the usual dimensions, that is, approximately an 8λ8 foot cross section and have lengths of between 10 to 60 feet. Lower container 11 is shown at rest on a support 14 of a container vessel 16 or rail car or the like. Each container includes upper and lower anchor slots 18 preferably positioned on the upper and lower surface of each container, which have engaging holes, such as horizontally oriented, preferably oblong apertures 20, that is, apertures having parallel sides 21 and curved ends 22. An inverted automatic container interlock apparatus 100 connects each adjacent set of corner connection points between upper container 12 and lower container 11, such as lower corner slots 18 of upper container 12 and upper corner slots 18 of lower container 11, respectively, and automatically locks upper and lower anchor slots 18 of upper container 12 and lower container 11 one to the other to temporarily lock, latch, or releasably affix upper container 12 to lower container 11.

It is contemplated herein that corner slots 18 may be configured in different shapes, positions, and sizes and that automatic container interlock apparatus 100 may be configured likewise to be inserted therein upper and lower corner slots, such as upper and lower anchor slots 18. It is contemplated herein that corner slots 18, may have inner parallel sides to form a lip or rim therebetween.

Referring again to FIG. 1, by way of example, and not limitation, there is illustrated an example embodiment of upper container 12 being lowered, for example by a crane, toward and on top of lower container 11 with automatic container interlock apparatus 100 may be releasably affixed to lower corner slots 18 of upper container 12 and lower corner slots 18 of upper container 12 are aligned vertically above upper corner slots 18 of lower container 11. Upper container 12 lower corner slots 18 positioned above lower container 11 upper corner slots 18 with automatic container interlock apparatus 100 preferably affixed or positioned therein upper container 12 lower corner slots 18. Moreover, when upper container 12 is lowered on to lower container 11 with automatic container interlock apparatus 100 releasably affixed to lower corner slots 18 of upper container 12 container latching device 100 is preferably engaged by contact with lower container 11 or more specifically contact with upper corner slots 18 of lower container 11, most specifically with corner slots 18 having lip or rim and, thus, such inward force IF causes automatic container interlock apparatus 100 to initiate a change of position and releasably lock or latch lower corner slots 18 of upper container 12 to upper corner slots 18 of lower container 11 one to the other and likewise to lock or latch lower container 11 and upper container 12 to each other. Upper container 12 lower corner slots 18 lowered on to lower container 11 upper corner slots 18 with automatic container interlock apparatus 100 affixed to upper container 12 lower corner slot 18 and automatic locking container interlock 100 locking upper and lower corner slots 18 together.

It is contemplated herein that automatic container interlock apparatus 100 may be releasably affixed to upper corner slots 18 of lower container 11 in some circumstances.

Figure 2A:
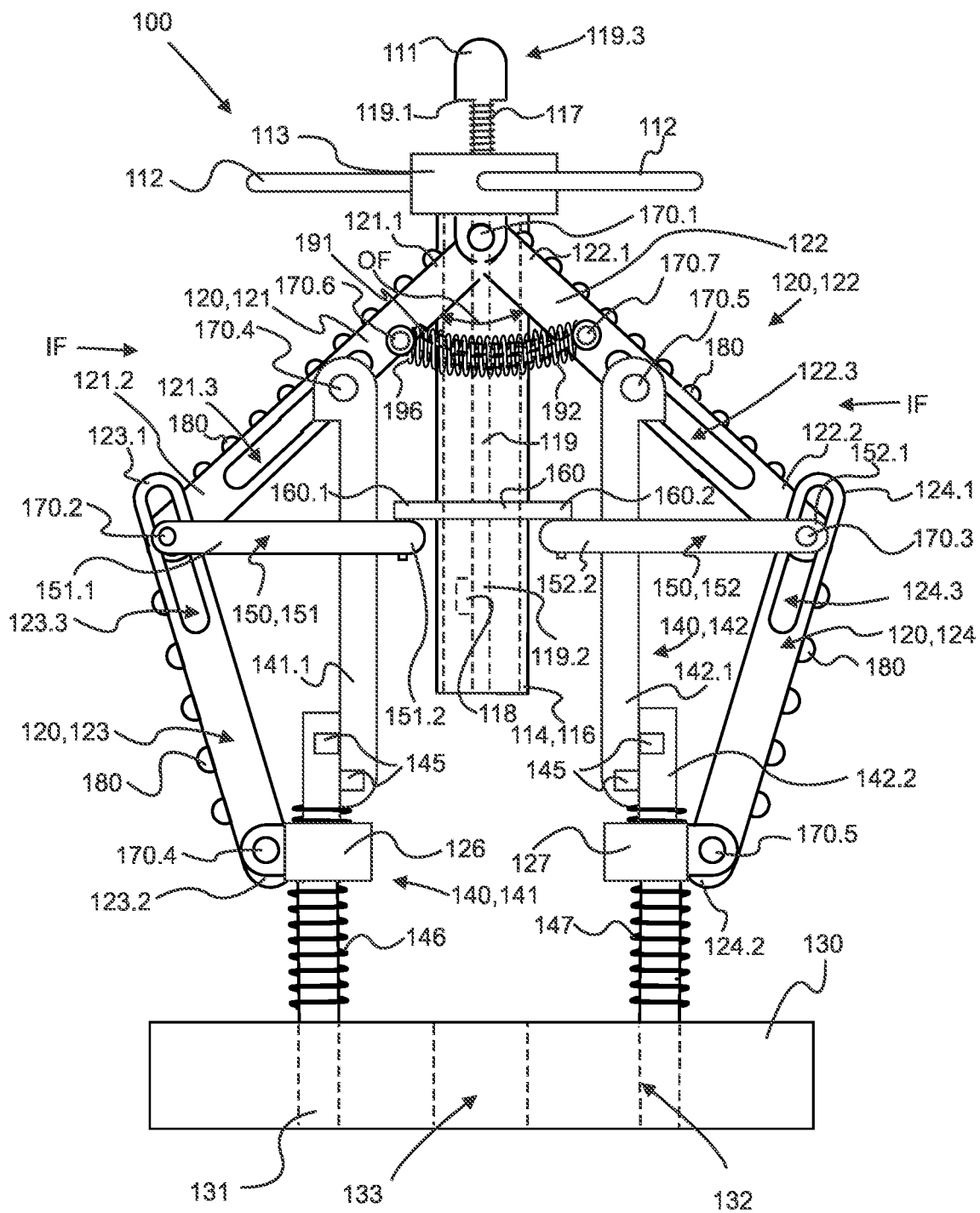
FIG. 2A is a front view of automatic locking container interlock apparatus according to select embodiments of the instant disclosure, shown before engagement.
Figure 2B:
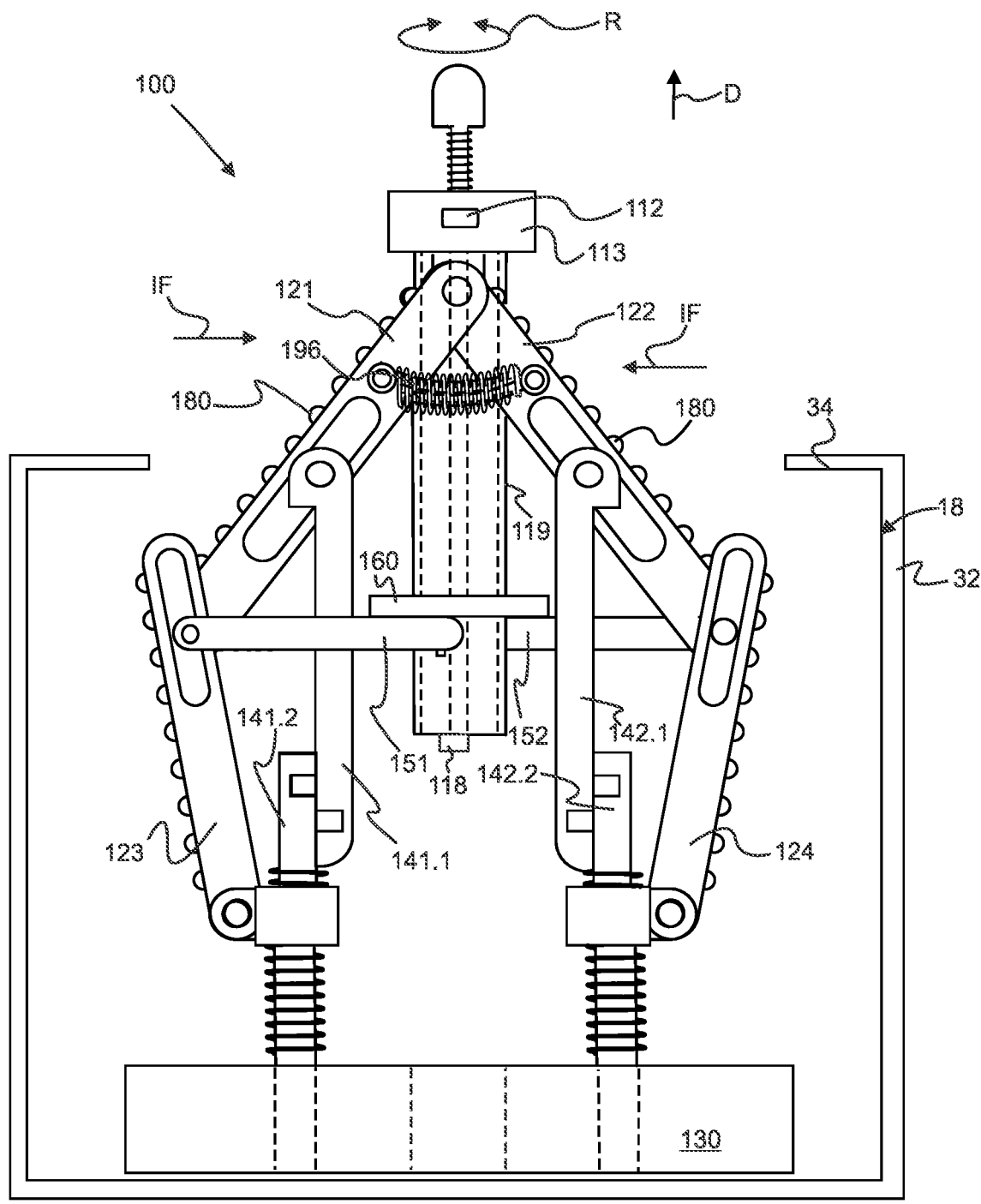
FIG. 2B is a front view of automatic locking container interlock apparatus according to select embodiments of the instant disclosure, shown engaged and locked.
Figure 2C:
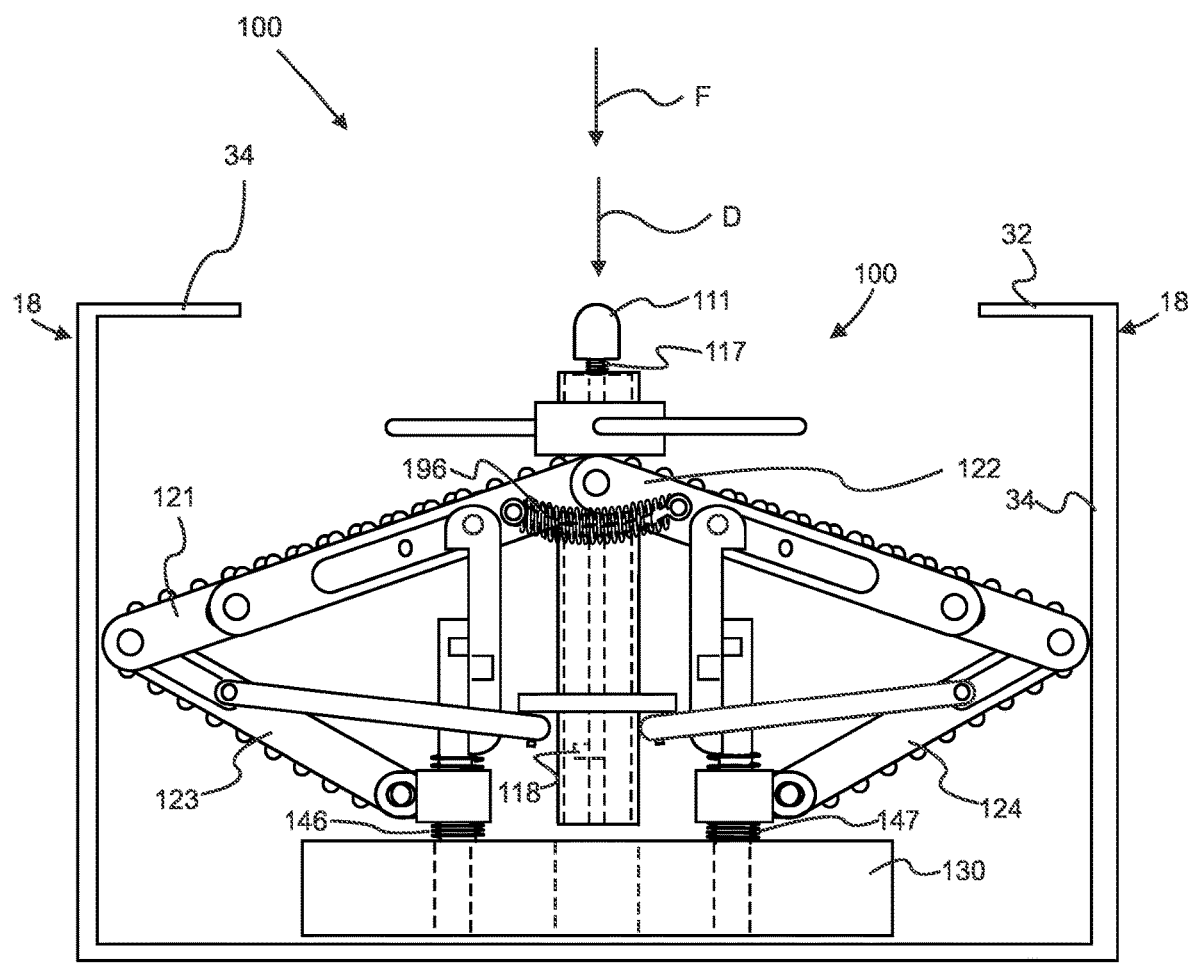
FIG. 2C is a front view of automatic locking container interlock apparatus according to select embodiments of the instant disclosure, shown compressed.

Referring now to FIGS. 2A, 2B, 2C, by way of example, and not limitation, there is illustrated an example embodiment of container latching device, such as automatic container interlock apparatus 100 and its subassemblies. Automatic container interlock apparatus 100 may include a base, such as lower unit 130 configured to releasably affix therein one of each lower corner slots 18 of upper container 12, or alternatively in lower container 11, preferably in a twist lock motion. It is contemplated herein that lower unit 130 may include a set screw or bolt to releasably affix lower unit 130 to each lower corner slot 18 of upper container 12.

Automatic container interlock apparatus 100 may include central shaft 114 having upper or first shaft end 115 and a lower or second shaft end 116. First shaft end 115 may include locking lever 112 positioned proximate first shaft end 115 and configured to rotate between a locked and unlocked position (90 degrees of rotation) to releasably affix upper container 12 to lower container 11 via an inward force IF. Second shaft end 116 of central shaft 114 may be configured to pass therethrough central passageway 133 of lower unit 130. Moreover, central shaft 114 may be configured as a tube or hollow having a passageway to house therein plunger, such as slide shaft plunger 119 configured to traverse vertically or up and down therein central shaft 114 and having upper or first shaft end 119.1 and a lower or second shaft end 119.2. Slide shaft plunger 119 may include friction bearing 111 mounted thereon to reduce rotational friction or sliding friction of central shaft 114 therethrough center passageway 133 of fixed lower unit 130 when in contact with upper corner slots 18 of lower container 11 or bed of rail car or truck or ground. Furthermore, slide shaft plunger 119 may include a biasing element, such as slide shaft extension spring 117 positioned therearound slide shaft plunger 119 and positioned between upper collar 113 positioned proximate first shaft end 115 and plunger head 119.3 positioned proximate first shaft end 119.1 of slide shaft plunger 119.

It is contemplated herein that locking lever 112 may be two sided or one sided and configured to rotate between an unlocked position and a locked position of a quarter turn rotation of central shaft 114 via an inward force IF to releasably affix upper container 12 to lower container 11 when preferably upper container 12 is lowered on to lower container 11.

Moreover, central shaft 114 may include drive wheel 160 preferably affixed to or formed thereon central shaft 114 and positioned approximately midway or midpoint between first shaft end 115 and second shaft end 116.

Furthermore, slide shaft plunger 119 may include locking key 118 preferably affixed to or formed thereon slide shaft plunger 119 and positioned between first shaft end 119.1 and second shaft end 119.2.

Automatic container interlock apparatus 100 further includes extension supports 140, such as first telescopic or vertical slide extension 141 and second telescopic or vertical slide extension 142 configured to vertically extend and collapse therein a left side or left passageway or first passageway 131 and right side or right passageway or second passageway 132, respectively of fixed lower unit 130. First vertical slide extension 141 may include upper slide extension 141.1 and lower slide extension 141.2 slidably affixed thereto and configured to vertically extend and collapse therein first passageway 131 of fixed lower unit 130. Second vertical slide extension 142 may include upper slide extension 142.1 and lower slide extension 142.2 slidably affixed thereto and configured to vertically extend and collapse therein second passageway 132 of fixed lower unit 130.

It is contemplated herein that includes extension supports 140 may each include a biasing element to fully extend extension supports 140, such as extension support spring 146, 147, respectively.

It is further contemplated herein that extension supports 140 may include a pair of magnets 145 positioned in each section, upper slide extension 141.1 and lower slide extension 141.2, and upper slide extension 142.1 and lower slide extension 142.2, respectively to lock or latch first telescopic or vertical slide extension 141 and second telescopic or vertical slide extension 142 in a full extension position.

In use position one, first telescopic or vertical slide extension 141 and second telescopic or vertical slide extension 142 preferably extend via force from biasing element to fully extend extension supports 140, such as extension support spring 146, 147 respectively, to enable automatic container interlock apparatus 100 to extend therein upper corner slot 18 of lower container 11 when upper container 12 is in contact with lower container 11.

In use position two, first telescopic or vertical slide extension 141 and second telescopic or vertical slide extension 142 preferably collapse therein first passageway 131 and second passageway 132, respectively of fixed lower unit 130 to enable automatic container interlock apparatus 100 to compress therein lower corner slot 18 of upper container 12 when upper container 12 is in contact with bed of rail car or truck or ground. Moreover, second shaft end 116 of central shaft 114 may collapse therein third passageway 133 of fixed lower unit 130 to enable automatic container interlock apparatus 100 to compress therein lower corner slot 18 of upper container 12 when upper container 12 is in contact with bed of rail car or truck or ground.

Moreover, a first or upper end of upper slide extension 141.1 and upper slide extension 142.1 may be slidably and pivotably connected to a midsection or first midsection slot 121.3 of first upper flex arm 121 and midsection or second midsection slot 122.3 of second upper flex arm 122, respectively via for example pivot pin 170.4 and 170.5, respectively.

Furthermore, an expansion device having first curved extension arm 191 may be pivotably connected to first upper flex arm 121 via pivot pin 170.6 and second curved extension arm 192 pivotably connected to second upper flex arm 122 via pivot pin 170.7. First curved extension arm 191 and second curved extension arm 192 slidable overlap and may further be wrapped by a biasing element, such as such as expansion spring 196, which biases upper first upper flex arm 121 and second upper flex arm 122 in an outward direction D.

In use, first curved extension arm 191 and second curved extension arm 192 may slidable overlap when first upper flex arm 121 and second upper flex arm 122 are compressed or pushed inward by inward force IF.

Returning to central shaft 114 may include a pivot anchor, such as shaft pin 170.1 preferably rotationally affixed to or formed thereon or positioned therein a radial groove or slot in central shaft 114 and positioned proximate first shaft end 115 of central rotating shaft 114 to support a pair of flexible arms 120 including a first flex arm assembly 121,123 and a second flex arm assembly 122, 124.

First flex arm assembly 120 may include, shaft pin 170.1 is preferably positioned to support or rotationally mount a first end, such as first end 121.1 of first upper flex arm 121 thereto central shaft 114. Moreover, a opposite end or other or second end 121.2 of first upper flex arm 121 may be rotationally affixed, pivotably connected, or coupled to first end 123.1 of first lower flex arm 123 via for example pivot pin 170, second pivot pin 170.2. Second pivot pin 170.2 may travel therein upper section slot 123.3 positioned proximate first end 123.1 of first lower flex arm 123.

Furthermore, an opposite or other or second end 123.2 of first lower flex arm 123 may be slidably connected or affixed thereto, in a vertical direction, to a slider, such as first collar slider 126 via for example pivot pin 170.4. First collar slider 126 may be affixed or positioned around lower slide extension 141.2, 141. Pivotable first upper flex arm 121 working with first lower flex arm 123 may be configured to extend and retract or compress and expand via inward force IF.

Second flex arm assembly 120 may include, shaft pin 170.1 is preferably positioned to support or rotationally mount a first end, such as first end 122.1 of second upper flex arm 122 thereto central shaft 114. Moreover, an opposite end or other or second end 122.2 of second upper flex arm 122 may be rotationally affixed, connected, or coupled to first end 124.1 of second lower flex arm 124, via for example pivot pin 170.3. Pivot pin 170.3 may travel therein upper section slot 124.3 positioned proximate first end 124.1 of second lower flex arm 124.

Furthermore, an opposite or other or second end 124.2 of second lower flex arm 124 may be slidably connected or affixed thereto, in a vertical direction, to a slider, such as second collar slider 127, via for example pivot pin 170.5. Second collar slider 127 may be affixed or positioned around lower slide extension 142.2, 142. Pivotable second upper flex arm 122 working with second lower flex arm 124 may be configured to extend and retract or compress and expand via inward force IF.

Still furthermore, pair of flexible arms 120 including a first flex arm assembly 121,123 and a second flex arm assembly 122, 124 may be configured with a plurality of second friction bearings 180 affixed thereto to reduce friction between the pair of flexible arms 120 including a first flex arm assembly 121,123 and a second flex arm assembly 122, 124 when in contact with corner slots 18 having lip or rim.

In use position one, pivotable first upper flex arm 121 and second upper flex arm 122 working with first lower flex arm 123 and second lower flex arm 124 may compress inward via inward force IF to enable automatic container interlock apparatus 100 to extend therein upper corner slot 18 of lower container 11 when upper container 12 is in contact with lower container 11 and change from an unlocked to a locked state of automatic container interlock apparatus 100.

In use position two, pivotable first upper flex arm 121 and second upper flex arm 122 working with first lower flex arm 123 and second lower flex arm 124 may push or extend outward via expansion spring 196, which biases upper first upper flex arm 121 and second upper flex arm 122 in an outward direction OD.

Moreover, automatic container interlock apparatus 100 may include rotational drive arms 150, such as first rotational drive arm 151 and second rotational drive arm 152 pivotably connected to either first upper flex arm 121 and second upper flex arm 122 or first lower flex arm 123 and second lower flex arm 124, respectively, preferably first end 151.1 of first rotational drive arm 151 may be pivotably connected to pivot pin 170.2 and first end 152.1 of second rotational drive arm 152 may be pivotably connected to pivot pin 170.3. Furthermore, an opposite or other or second end 151.2 of first rotational drive arm 151 may be rotationally connected to one side of circumference or first position 160.1 of drive wheel 160 preferably affixed to or formed thereon central shaft 114 and an opposite end or second end 152.2 of second rotational drive arm 152 may be pivotably connected to opposite side of circumference or second position 160.2 of drive wheel 160.

In operation position 1, horizontal or inward force IF on either first upper flex arm 121 and/or second upper flex arm 122 or first lower flex arm 123 and/or second lower flex arm 124 forces first rotational drive arm 151 and second rotational drive arm 152 inward and causes rotation R of drive wheel 160 and locking lever 112, and thus a rotation of locking lever 112 positioned proximate first shaft end 115 and configured to rotate between a locked and unlocked position (90 degrees of rotation to lock position) to releasably affix or releasably lock/latch upper and lower corner slots 18 together of container 12 and container 11, when for example, rim 34 of upper corner slots 18 of lower container 11 contacts first upper flex arm 121 and second upper flex arm 122 to produce inward force IF compress expansion spring 196.

In operation position 2, a vertical force F on plunger head 119.3 positioned proximate first shaft end 119.1 of slide shaft plunger 119 to pivot first upper flex arm 121 and second upper flex arm 122 working with first lower flex arm 123 and second lower flex arm 124 to compress or collapse together and change from an extended position of automatic container interlock apparatus 100 to a compressed state of automatic container interlock apparatus 100 to tuck automatic container interlock apparatus 100 therein lower corner slot 18 of upper container 12 or lower container 11 within rim 32 with compressed slide shaft extension spring 117 of slide shaft plunger 119, retracted extension supports 140, and compressed extension support spring 146, 147.

Figure 3A:
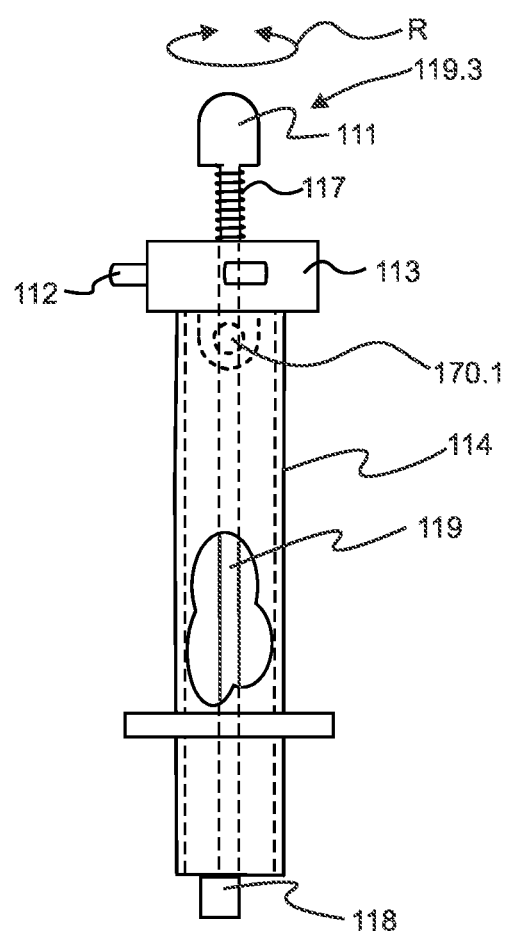
FIG. 3A is a side view of central shaft, locking lever, plunger in locked position of FIG. 2 according to select embodiments of the instant disclosure.
Figure 3B:
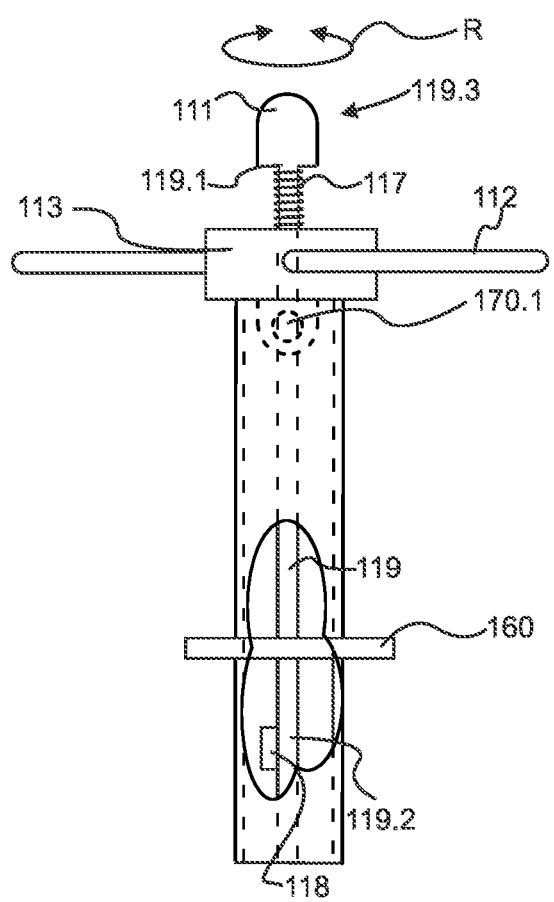
FIG. 3B is a view of central shaft, locking lever, plunger in un locked position of FIG. 2 according to select embodiments of the instant disclosure.
Figure 3C:
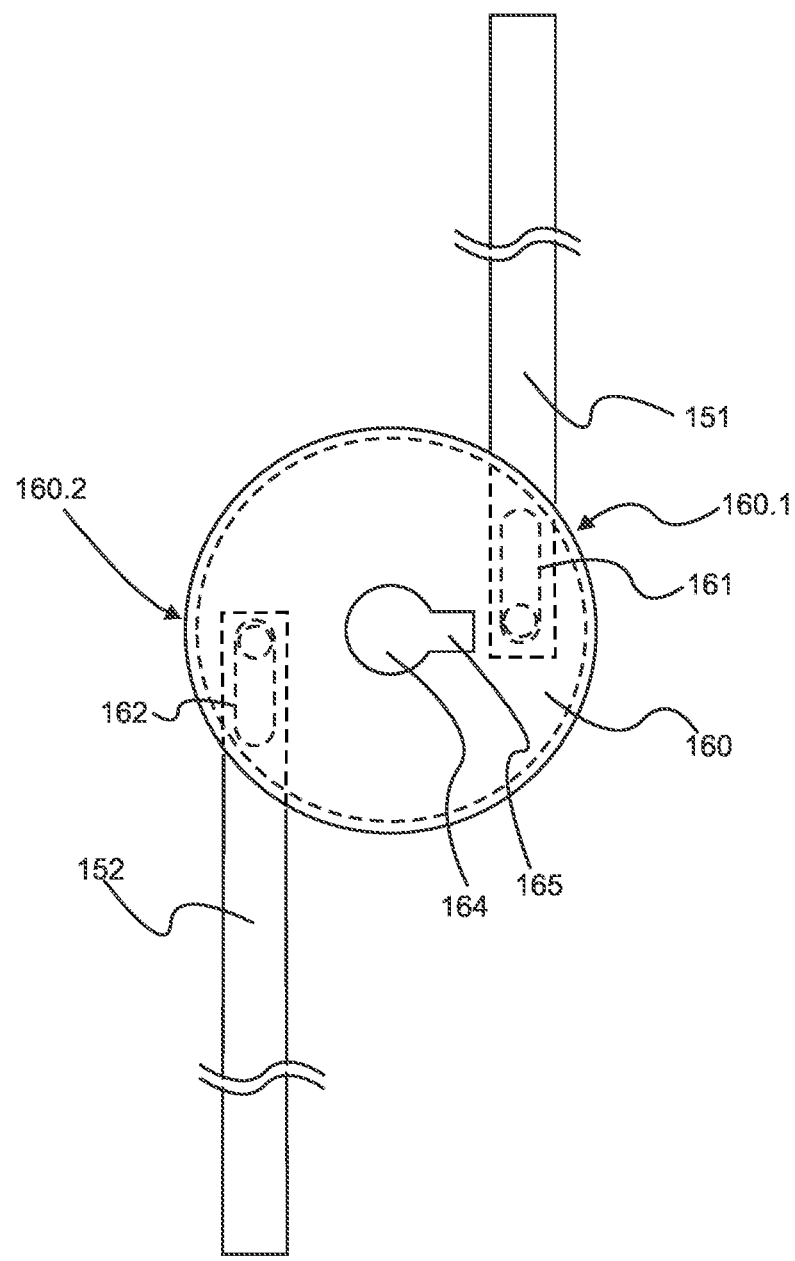
FIG. 3C is a view of drive wheel of FIG. 2 according to select embodiments of the instant disclosure.

Referring now to FIGS. 3A, 3B, and 3C by way of example, and not limitation, there is illustrated an example embodiment of central shaft 114 and slide/rotating shaft plunger 119 therein of the automatic container interlock apparatus 100. Central shaft 114 having upper or first shaft end 115 and a lower or second shaft end 116. First shaft end 115 may include rotating locking lever 112 positioned proximate first shaft end 115 and configured to rotate between a locked and unlocked position (90 degrees of rotation) to releasably affix upper container 12 to lower container 11 via an inward force IF. Second shaft end 116 of central shaft 114 may be configured to pass therethrough central passageway 133 of lower unit 130. Moreover, central shaft 114 may be configured as a tube or hollow to house therein rotating plunger, such as slide/rotating shaft plunger 119 configured to traverse vertically or up and down and rotationally therein central shaft 114 and having upper or first shaft end 119.1 to engage or be affixed to rotating locking lever 112 and a lower or second shaft end 119.2. Slide shaft plunger 119 may include rotation or lock key 118 positioned between first shaft end 119.1 and second shaft end 119.2 to engage drive wheel 160 and rotate locking lever 112 between unlocked/unlatched position and locked/latched position to releasably lock/latch upper and lower corner slots 18 together of container 12 and container 11. Slide shaft plunger 119 may include first friction bearing 111 mounted thereon to reduce rotational friction or sliding or rotational friction of upper or first shaft end 119.1 when in contact with upper corner slots 18 of lower container 11 or bed of rail car or truck or ground. Furthermore, slide shaft plunger 119 may include a biasing element, such as slide shaft extension spring 117 positioned therearound slide shaft plunger 119 and positioned between upper collar 113 positioned proximate first shaft end 115 and plunger head 119.3 positioned proximate first shaft end 119.1 of slide shaft plunger 119.

Moreover, central shaft 114 may be configured as a tube or hollow to house therein plunger, such as slide shaft plunger 119 configured to traverse vertically or up and down rotate therein central shaft 114 and having upper or first shaft end 119.1 and a lower or second shaft end 119.2. Slide shaft plunger 119 may include friction bearing 111 mounted thereon to reduce rotational friction or sliding friction of slide shaft plunger 119 therethrough center passageway of central shaft 114 when in contact with upper corner slots 18 of lower container 11 or bed of rail car or truck or ground. Furthermore, slide shaft plunger 119 may include a biasing element, such as slide shaft extension spring 117 positioned therearound slide shaft plunger 119 and positioned between upper collar 113 positioned proximate first shaft end 115 and plunger head 119.3 positioned proximate first shaft end 119.1 of slide shaft plunger 119.

Furthermore, drive wheel 160 preferably affixed to or formed thereon central shaft 114 and positioned approximately midway or midpoint between first shaft end 115 and second shaft end 116 may be configured with a key hole, such as wheel aperture 164 and notch 165 configured to receive and pass therethrough or second shaft end 119.2 and to latch or lock and unlock or unlatch locking key 118. Again, drive wheel 160 may be configured with first slot 161 positioned proximate one side of circumference or first position 160.1 of drive wheel 160 and second slot 162 positioned proximate other side of circumference or first position 160.1 of drive wheel 160, and each first slot 161 configured to receive opposite or other or second end 151.2 of first rotational drive arm 151 and second slot 162 configured to receive an opposite end or second end 152.2 of second rotational drive arm 152 of drive wheel 160 to enable collapse of automatic container interlock apparatus 100, as shown in FIG. 2C.

It is contemplated herein that automatic container interlock apparatus 100 components may be constructed of steel, stainless steel, aluminum, titanium or the like materials and of different dimensions. This and other materials herein may be constructed of metal, steel, alloy, or plastic or more specifically high density polyethylene or similar high tensile or strengthened materials, as these material offers a variety of forms and shapes and provide strength with reduced weight; however, other suitable materials or the like, can be utilized, provided such material has sufficient strength and/or durability as would meet the purpose described herein.

It is understood herein that various changes in the material used, shape, size, arrangement of parts, and parts are removeably connected with threads, or other rotating devices without departing from the spirit of the scope of the claims herein.

It is further understood herein that the parts and elements of this disclosure may be located or position elsewhere based on one of ordinary skill in the art without deviating from the present disclosure.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. An automatic container interlock apparatus to releasably affix a lower corner slot of an upper container to an upper corner slot of a lower container, said apparatus comprising:

a lower unit configured to releasably affix therein the lower corner slot of the upper container, said lower unit having a center passageway, a left passageway, and a right passageway;

a central shaft having a first shaft end and a second shaft end, said central shaft having a drive wheel positioned approximately midway between said first shaft end and second shaft end, said central shaft having a locking lever positioned proximate said first shaft end and configured to rotate between a locked and an unlocked position, said second shaft end configured to slide therein said center passageway, said central shaft having a drive wheel affixed to said central shaft a midpoint between said first shaft end and said second shaft end;

a first vertical slide extension and second vertical slide extension, said first vertical slide extension configured to vertically extend and collapse in said left passageway and said second vertical slide extension configured to vertically extend and collapse right passageway, said first vertical slide extension having a first extension support spring positioned proximate a lower end of said first vertical slide extension and configured to extend said first vertical slide extension, said second vertical slide extension having a second extension support spring positioned proximate a lower end of said second vertical slide extension and configured to extend said second vertical slide extension, said first vertical slide extension having a first collar slider positioned around a lower end of said first vertical slide extension, said second vertical slide extension having a second collar slider positioned around a lower end of said second vertical slide extension;

a shaft pin, said shaft pin slidably connected to said central shaft proximate said first shaft end;

a pair of flex arms having a first flex arm assembly and a second flex arm assembly, said first flex arm assembly having first upper flex arm having a first end and a second end, said first end of said first upper flex arm pivotably connected to said shaft pin and a second end of said first upper flex arm pivotably connected to a first end of a first lower flex arm via a first pivot pin, a second end of said first lower flex arm pivotably connected to said first collar slider, said second flex arm assembly having second upper flex arm having a first end and a second end, said first end of said second upper flex arm pivotably connected to said shaft pin and a second end of said second upper flex arm pivotably connected to a first end of a second lower flex arm via a second pivot pin, a second end of said second lower flex arm pivotably connected to said second collar slider;

an expansion device having first curved extension arm, a second curved extension arm, and an extension spring wrap therearound said first curved extension arm and said second curved extension arm, a first end of said first curved extension arm pivotably connected to said first upper flex arm and a first end of said second curved extension arm pivotably connected to said second upper flex arm, said expansion device configured to separate said first upper flex arm and said second upper flex arm; and a first rotational drive arm and a second rotational drive arm, a first end of said first rotational drive arm pivotably connected to said first pivot pin and a second end of said first rotational drive arm pivotably connected to a first side of said drive wheel, a first end of said second rotational drive arm pivotably connected to said second pivot pin and a second end of said second rotational drive arm pivotably connected to a second side of said drive wheel.

2. The apparatus of claim 1, wherein said central shaft is configured as a tube.

3. The apparatus of claim 1, wherein said first pivot pin is configured to traverse in an upper section slot positioned proximate said first end of said first lower flex arm.

4. The apparatus of claim 3, wherein said second pivot pin is configured to traverse in an upper section slot positioned proximate said first end of said second lower flex arm.

5. The apparatus of claim 1, wherein said first vertical slide extension further comprising an upper slide extension and a lower slide extension of said first vertical slide extension slidably affixed one to the other.

6. The apparatus of claim 5, wherein said second vertical slide extension further comprising an upper slide extension and a lower slide extension of said second vertical slide extension slidably affixed one to the other.

7. The apparatus of claim 5, wherein said upper slide extension and said lower slide extension of said first vertical slide extension further comprising a pair of magnets to lock said upper slide extension and said lower slide extension of said first vertical slide extension in a full extension position.

8. The apparatus of claim 7, wherein said upper slide extension and said lower slide extension of said second vertical slide extension further comprising a pair of magnets to lock said upper slide extension and said lower slide extension of said second vertical slide extension in a full extension position.

9. The apparatus of claim 2, wherein said tube further comprising a slide shaft plunger configured to configured to traverse therein said tube.

10. The apparatus of claim 1, wherein said slide shaft plunger further comprising a first shaft end and a second shaft end, said first shaft end having a plunger head.

11. The apparatus of claim 10, wherein said plunger head further comprising a first friction bearing mounted thereon.

12. The apparatus of claim 10, wherein said first flex arm assembly and said second flex arm assembly further comprising a plurality of second friction bearings mounted thereon.

* * * * *